United States Patent [19]

Onizawa

[11] 4,146,689
[45] Mar. 27, 1979

[54] VULCANIZABLE COMPOSITIONS OF BROMOBUTYL RUBBER AND AMINO ACIDS

[75] Inventor: Masao Onizawa, Ohmiya, Japan

[73] Assignee: Sanyo Trading Co., Ltd., Tokyo, Japan

[21] Appl. No.: 743,211

[22] Filed: Nov. 18, 1976

Related U.S. Application Data

[62] Division of Ser. No. 625,874, Oct. 24, 1975.

[30] Foreign Application Priority Data

Oct. 29, 1974 [JP] Japan .................................. 49/124031
Oct. 2, 1975 [JP] Japan .................................. 50/118242

[51] Int. Cl.² .......................... C08F 8/34; C08C 19/20
[52] U.S. Cl. .................................. 526/36; 260/23.7 M; 260/884; 526/18; 526/39; 526/41; 526/49
[58] Field of Search ...................... 526/18, 20, 30, 49, 526/41; 260/79.5 R, 79.5 B, 23.7 M, 783

[56] References Cited

U.S. PATENT DOCUMENTS

| | | | |
|---|---|---|---|
| 1,477,805 | 12/1923 | Bedford | 260/79.5 R |
| 2,631,984 | 3/1953 | Crawford | 526/18 |
| 3,098,055 | 7/1963 | Lemiszka | 526/43 X |
| 3,104,235 | 9/1963 | Kuntz | 526/17 |
| 3,624,029 | 11/1971 | Inagami | 260/45.9 |

Primary Examiner—C. A. Henderson
Attorney, Agent, or Firm—Wenderoth, Lind & Ponack

[57] ABSTRACT

A vulcanizable composition comprising a bromobutyl rubber and a specific amino acid.

6 Claims, 8 Drawing Figures (VULCANIZATION CURVE OF EXAMPLE 1 BATCH)

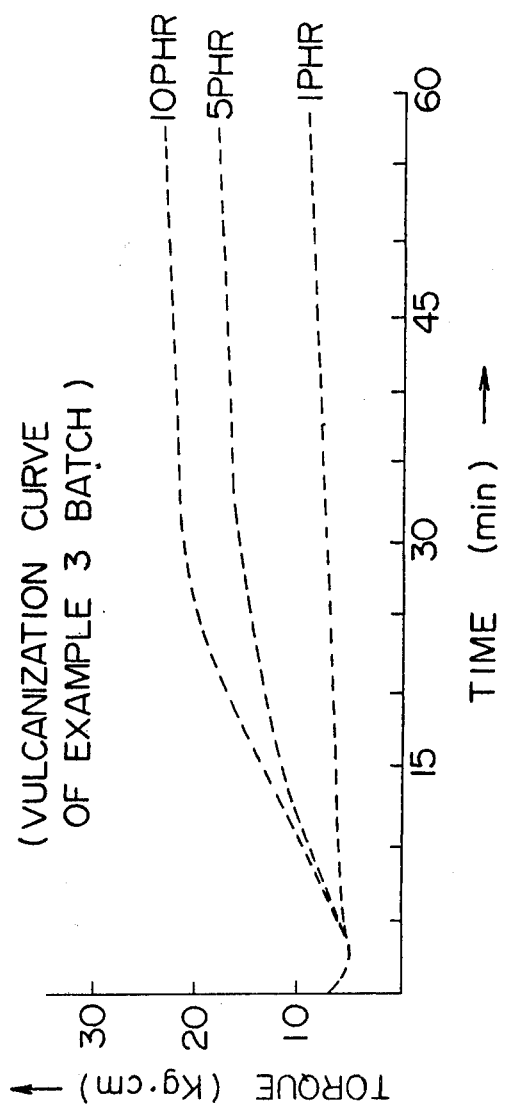

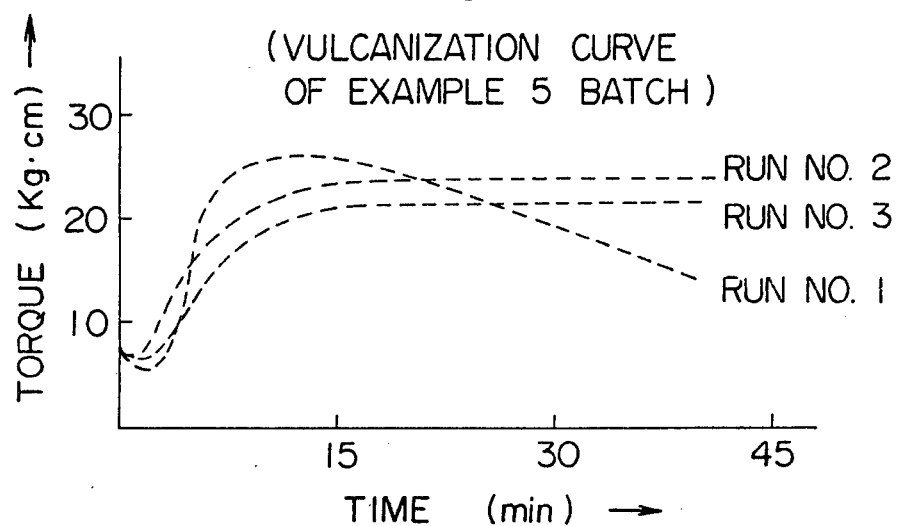
Fig. 3 (VULCANIZATION CURVE OF EXAMPLE 5 BATCH)
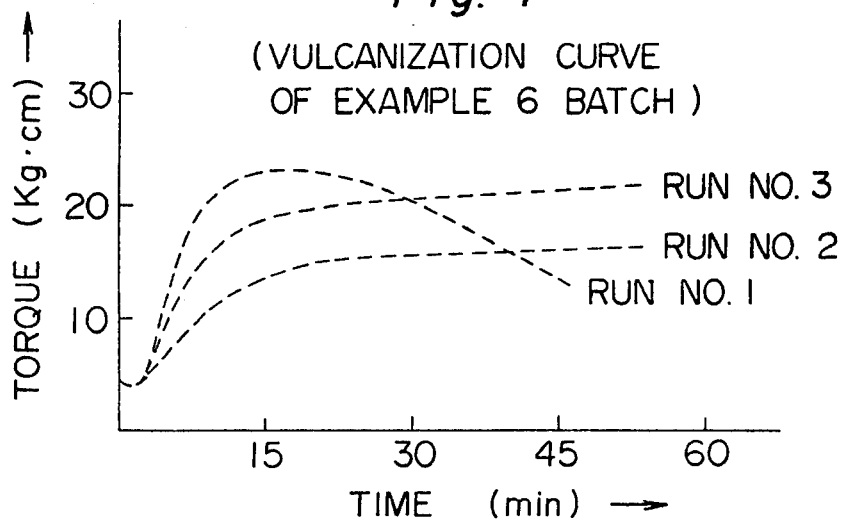
Fig. 4 (VULCANIZATION CURVE OF EXAMPLE 6 BATCH)

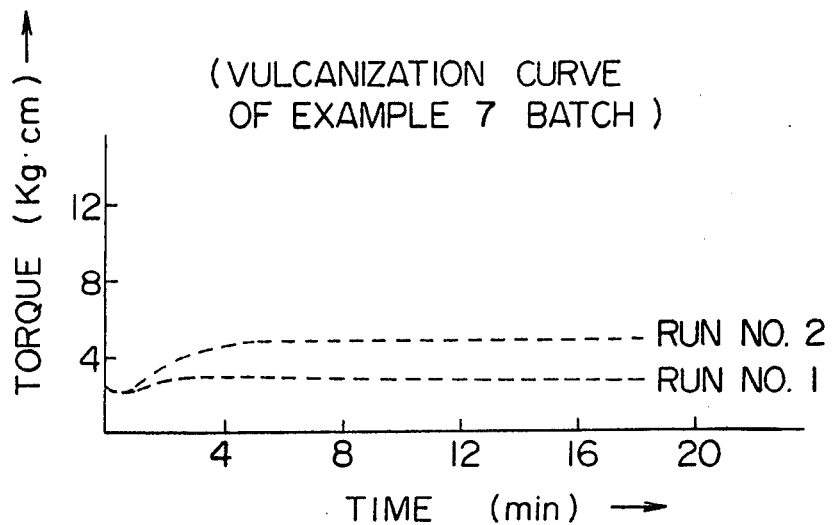
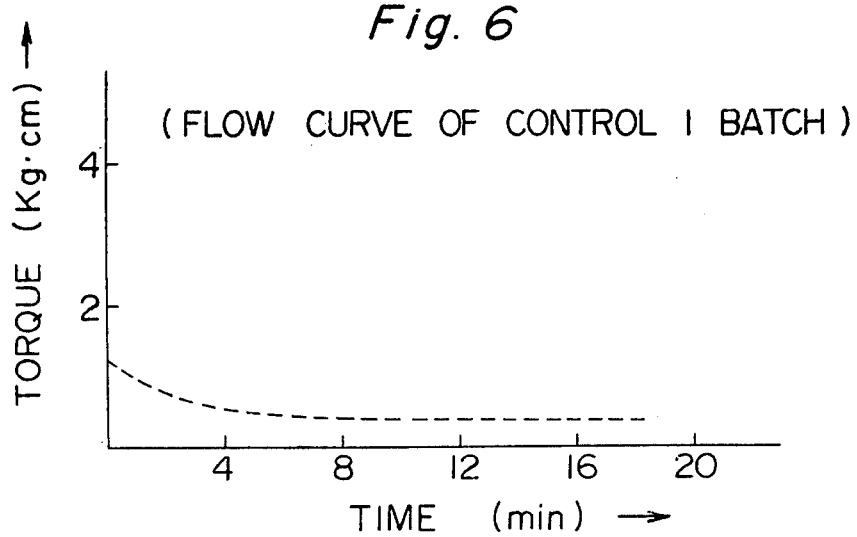

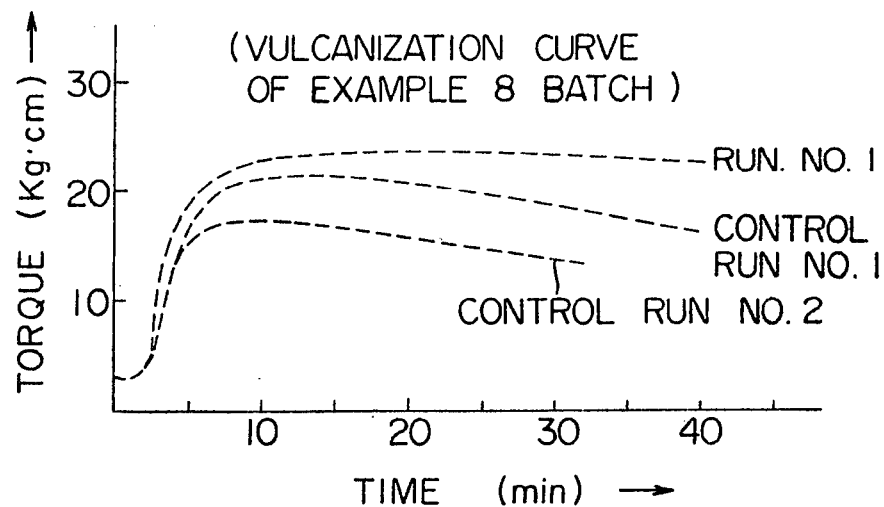
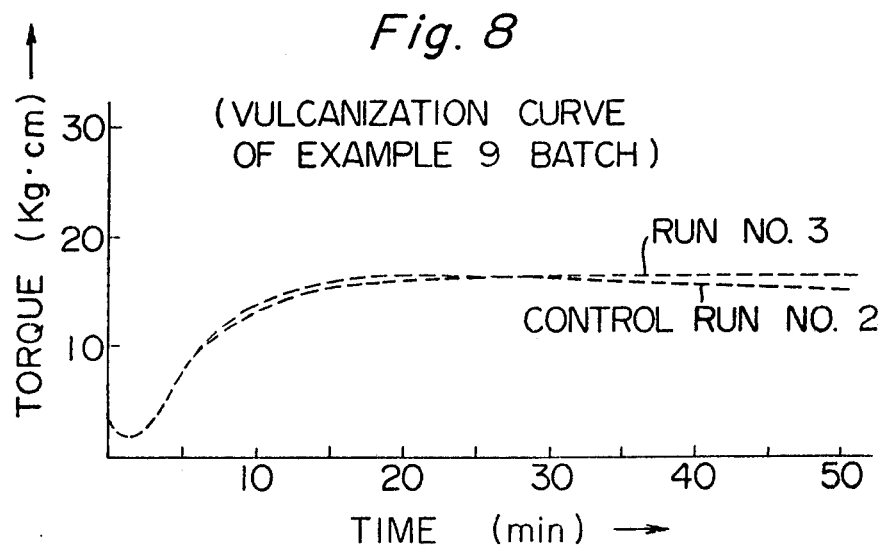

VULCANIZABLE COMPOSITIONS OF BROMOBUTYL RUBBER AND AMINO ACIDS

This is a divisional of Ser. No. 625,874, filed Oct. 24, 1975.

FIELD OF THE INVENTION

This invention relates to novel vulcanizable compositions comprising bromobutyl rubber (also called brominated butyl rubber) and amino acid, and also to the vulcanized rubbers prepared therefrom.

BACKGROUND OF THE INVENTION

Butyl rubber which is a copolymer of isobutylene with a minor amount of isoprene is known for its excellent physical properties such as high weather-proofness, aging resistance, ozone resistance and heat resistance, favorable electrical properties and extremely low gas permeability. However, the rubber also has such defects as low elasticity, low rate of vulcanization and poor compatibility with other rubbers. As a means for eliminating such defects while retaining the foregoing advantageous properties, rather recently bromobutyl rubber was proposed.

As the vulcanizing agent of the bromobutyl rubber, sulfur, sulfur-donor, quinoid compound, resins such as phenolformaldehyde resin, metal oxides such as zinc oxide, and peroxides such as dicumyl peroxide are already known. Those known vulcanizing agents, however, invariably have one or other deficiencies as described below.

To wit, if sulfur alone is used as the vulcanizing agent, heavy mold staining takes place, and consequently the concurrent use of an acid acceptor such as lead oxide and zinc oxide is essential. However, it invites the elution of toxic acid acceptor during usage of the final rubber products, and inhibits the products' use in the fields of medicines and foods, for example, as bottles or stoppers. Also in the vulcanization with sulfur, the phenomenon of reversion is conspicuous, i.e., the rubber molecules are deteriorated when heated for a prolonged period at the vulcanizing temperature, to have impaired tensile strength and tension and increased elongation and stickiness. The occurrence of reversion can be confirmed by drawing the vulcanization curve using, for example, an oscillating disc rheometer, in which the torque reaches the maximum at a certain point of vulcanization, and thereafter decreases instead, as the vulcanization time is prolonged. As well known, normally the degree of reversion is great when sulfur is used as the vulcanizing agent, which not only renders the effective control of the operation extremely difficult, but causes qualitative deterioration of the vulcanized rubber obtained. Thus the prevention of reversion is keenly desirable. Furthermore, the vulcanization with sulfur causes notable color change of the vulcanized bromobutyl rubber to dark brown, and light colored rubber products cannot be formed therefrom.

As an attempt to inhibit the undesirable reversion in the vulcanization with sulfur, it is known to use a sulfur-donor, which releases active sulfur at the vulcanizing temperature, instead of sulfur. Although the reversion can be substantially avoided or markedly decreased by the substitution, there is produced another defect that generally the vulcanized rubber thereby obtained has reduced modulus. Furthermore, the problems of mold staining, necessity of using toxic acid acceptor to prevent the staining, and the objectionable color change in the vulcanized rubber remain unsolved.

In the vulcanization using quinoid, an activator such as red lead ($Pb_3O_4$) must be concurrently used, which also is apt to be eluted from the final rubber products and due to its toxicity renders the products unfit for the usages in medicinal and food industries, like the aforementioned case. Furthermore, mold staining also takes place. In the vulcanization using the resin, again due to the toxicity of the resin which is used as the vulcanizing agent and may be eluted, the vulcanized rubber is deficient for use in medicinal and food industries. Elution of toxic matter is also not avoidable in the vulcanization using an oxide of heavy metal such as zinc, and therefore the method is undesirable from the view of environmental pollution. If a peroxide is used as the vulcanizing agent, metal oxide or hydroxide must be concurrently used as the acid acceptor in order to avoid the mold staining. Similarly to the case of sulfur vulcanization, the toxicity of such acid acceptor which may be eluted from the rubber products renders the method defective.

SUMMARY OF THE INVENTION

An object of the present invention is to provide novel vulcanizing agents for bromobutyl rubber, which are free from the aforementioned defects.

According to the invention, novel vulcanizable rubber compositions which comprise bromobutyl rubber and amino acid, and also the vulcanized rubber obtained by vulcanizing the compositions, are provided.

DESCRIPTION OF THE DRAWINGS

FIGS. 1 through 5 and 7 through 8 show the vulcanization curves of the compositions used in the Examples, and FIG. 6 shows the flow curve of the composition used in the Control.

DESCRIPTION OF THE PREFERRED EMBODIMENTS

Figure 1:
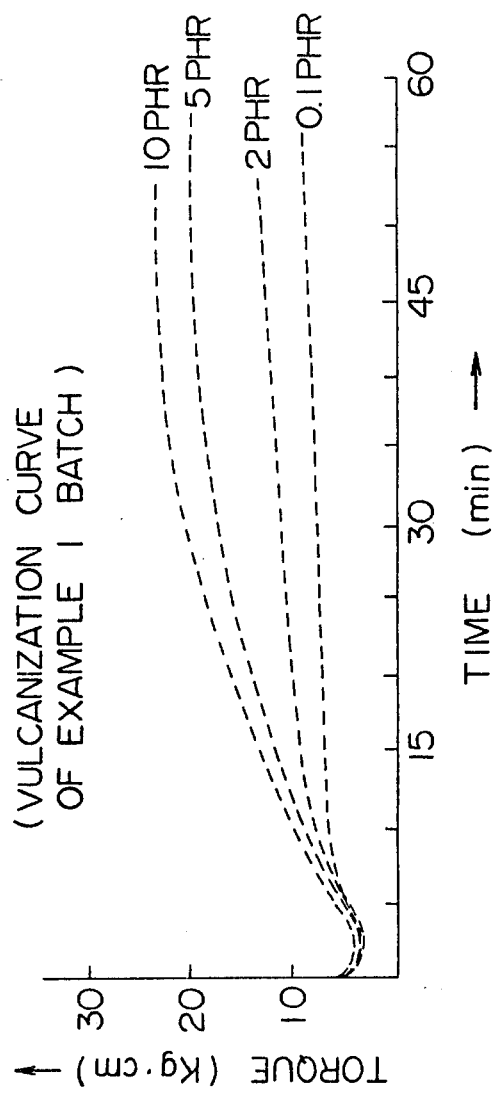

The first preferred embodiment of the invention provides the vulcanizable compositions comprising bromobutyl rubber and at least one amino acid selected from the group consisting of arginine, lysine, hydroxylysine, ornithine, cystine, asparagine, glutamine and citrulline; and the vulcanized rubber obtained by vulcanizing the compositions.

The surprising fact is for the first time discovered by us that the above-named specific amino acids (which will hereinafter be referred to as the amino acids of first kind) possess excellent vulcanizing effect on bromobutyl rubber but none of the deficiencies of conventional vulcanizing agents as aforesaid.

That the above amino acids of the first kind possess excellent vulcanizing effect on bromobutyl rubber, is heretofore entirely unknown.

When the amino acids of the first kind are used as the vulcanizing agent, neither the acid acceptor needed with sulfur, sulfur-donor and peroxide vulcanizing agents nor the vulcanization-accelerator normally used with sulfur, quinoid and resin vulcanizing agents are required. Again the phenomenon of reversion occurring with sulfur vulcanizing agent is nil. Furthermore, if the amino acid vulcanizing agent were extracted from the final rubber product, it possesses no toxicity and consequently, presents no problem.

The above-specified amino acids of the first kind exhibit excellent vulcanizing effect on bromobutyl rubber, but surprisingly show no vulcanizing action to chlorobutyl rubber which has a closely resembling structure to bromobutyl rubber, as clearly demonstrated in later given Control 1.

The suitable amount of the above amino acids(s) of the first kind for use as the vulcanizing agent is, as the total of the amino acid component, 0.01 to 50, preferably from 0.1 to 10 parts by weight, per 100 parts by weight of bromobutyl rubber.

The second preferred embodiment of the present invention provides the vulcanizable compositions comprising bromobutyl rubber, at least one amino acid selected from the group consisting of arginine, lysine, hydroxylysine, ornithine, cystine, asparagine, glutamine and citrulline, and at least one known vulcanizing agent selected from the group consisting of sulfur, sulfur-donor and peroxide; and also the vulcanized rubber obtained by vulcanizing the compositions.

The amino acids useful in the second embodiment are the same to those of the first kind to be employed in the first embodiment, and as already mentioned, can be used themselves as the vulcanizing agent of bromobutyl rubber. We for the first time discovered, however, that the composite vulcanizing agent composed of the mixture of an amino acid or acids of the first kind with at least one known vulcanizing agent selected from the group consisting of sulfur, sulfur-donor and peroxide also exhibits excellent vulcanizing effect on bromobutyl rubber, and that the composite vulcanizing agent does not require the concurrent use of toxic acid acceptor which has been essential with those known vulcanizing agents.

As the specific examples of preferred sulfur-donor useful in the second embodiment of the invention, the following may be named: tetraethylthiuram disulfide, tetraethylthiuram monosulfide, tetrabutylthiuram disulfide, N,N'-dimethyl-N,N-diphenylthiuram disulfide, dipentamethylenethiuram monosulfide, dipentamethylenethiuram disulfide, dipentamethylenethiuram tetrasulfide, dipentamethylenethiuram hexasulfide, dicyclopentamethylenethiuram disulfide, mixed alkyl thiuram disulfide, tetramethylthiuram monosulfide, tetramethylthiuram disulfide, sulfur monochloride, sulfur dichloride, morpholine disulfide, alkyl phenol disulfide, N,N'-dithio-bis(hexahydro-2H-azepinone-2), 2-mercaptobenzothiazole, 2-mercaptothiazoline, dibenzothiazyl disulfide, N,N-diethylthiocarbamoyl-2-benzothiazolyl sulfide and 2-(2,6-dimethyl-4-morpholinothio)benzothiazole.

Also as the peroxide, any of the organic peroxides conventionally used as the vulcanizing agent of bromobutyl rubber can be used, specific examples including di-t-butyl peroxide, t-butyl cumyl peroxide, dicumyl peroxide, α,α'-bis(t-butylperoxy)p-di-isopropylbenzene, 2,5-di-methyl-2.5-di(t-butylperoxy)hexane, 2.5-dimethyl-2.5-di(t-butylperoxy)hexyne-3, benzoyl peroxide, 2.4-dichloro benzoyl peroxide, t-butyl peroxy acetate, t-butylperoxy-2-ethylhexanoate, t-butylperoxy benzoate, 2.5-dimethyl-2.5-di(benzoyl peroxy)hexane, t-butyl peroxy isopropyl carbonate, parachlorobenzoyl peroxide and 1.1-di-tert butyl peroxy 3.3.5 trimethyl cyclo-hexane.

In the second embodiment, when a composite vulcanizing agent composed of an amino acid or acids of the first kind and sulfur, sulfur-donor and/or peroxide is used, the suitable amount of sulfur is from 0.01 to 30, preferably from 0.1 to 5.0 parts by weight, per part by weight of the total of amino acid component. If a sulfur-donor is used, the suitable amount is from 0.01 to 30, preferably from 0.1 to 5.0 parts by weight, per part of the amino acid, and that of the peroxide is from 0.01 to 10, preferably from 0.1 to 5.0 parts by weight. The composite vulcanizing agent is used in the amount of 0.06 to 50, preferably from 0.6 to 15 parts by weight, per 100 parts by weight of bromobutyl rubber.

When an amino acid or acids of the first kind is used with sulfur as a composite vulcanizing agent as in the second embodiment, the concurrent use of an acid acceptor in the vulcanization is unnecessary, and reversion which is a serious drawback with sulfur vulcanizing agent can be prevented. Furthermore, the objectionable color change as experienced with the use of sulfur alone can be prevented, and the composite vulcanizing agent enables the manufacture of light colored rubber product.

Similar advantages can be obtained by the composite vulcanizing agent comprising the amino acid and sulfur-donor, excepting the prevention of reversion which is achieved by the use of sulfur-donor alone.

With the composite vulcanizing agent composed of the amino acid of first kind and peroxide, the concurrent use of an acid acceptor, which is essential in the vulcanization using the peroxide alone, becomes unnecessary, and the degree of mold staining is drastically reduced compared with the conventional vulcanization system using the peroxide and acid acceptor in combination. Again the composite vulcanizing agent exhibits better vulcanizing ability than that of the conventional peroxide vulcanizing agent (i.e., produces higher cross-linking density), and as the consequence shortens the vulcanization time and improves the modulus and permanent compression set of the vulcanized bromobutyl rubber.

The third preferred embodiment of the invention provides vulcanizable compositions comprising bromobutyl rubber, at least one amino acid selected from the group consisting of tyrosine, threonine, tryptophan, proline, hydroxyproline, serine, histidine, glycine, glutamic acid, leucine, alanine, phenylalanine, valine, isoleucine, methionine and cysteine and a known vulcanizing agent selected from the group consisting of sulfur and sulfur-donor; and the vulcanized rubber obtained by vulcanizing the composition.

As previously mentioned various known vulcanizing agents have been used with bromobutyl rubber. Of the known vulcanizing agents, the most widely used in industry is sulfur. As already mentioned, however, sulfur vulcanizing agent has a number of serious defects, one of which is the notable reversion. The reversion can be considerably reduced by replacing sulfur by a sulfur-donor as the vulcanizing agent as aforesaid, but the resulting vulcanized rubber normally comes to have a reduced modulus. It is generally desirable that the modulus of vulcanized rubber should exceed a certain level. Particularly when it is used in preparing stoppers for phials, the requirement for the modulus exceeding a certain critical level is essential, because the stoppers must have good self-sealing property, i.e., the ability of the stoppers to automatically clog the holes caused by the injection needle to cut the contact of the phial content with outside air, to allow the injection needle to pierce through the stoppers to suck the phial content (for example, injectable liquid) into the syringe and be withdrawn. The vulcanization using a sulfur-donor produces very unsatisfactory result in this respect. Normally the modulus of vulcanized rubber can be improved by compounding a reinforcing agent with the rubber, but the reinforcing agent accelerates the tendency of the toxic additives present in the vulcanized rubber (e.g., acid acceptor for preventing mold staining, such as lead or zinc oxide, and vulcanization-accelerator such as tetramethylthiuram disulfide or dibenzothiazole disulfide) to be eluted from the final rubber products. Therefore, considering the toxicity of eluted injurious chemicals which is particularly recently causing a very serious problem, the use of reinforcing agent should be avoided especially in the fields of medicines and foods, or, if used, should be used in the minimum possible amount. It is extremely desirable, therefore, that the modulus of vulcanized rubber should be improved by the addition of safe and non-toxic chemicals, instead of the conventional reinforcing agents.

The third embodiment of the present invention effectively solves the above problem.

The amino acids of first kind to be used in the first and second embodiments of the invention are characteristic in that, as already mentioned, the amino acids themselves possess excellent vulcanizing effect on bromobutyl rubber. In contrast thereto, the amino acids useful in the third embodiment (which will be hereinafter referred to as the amino acids of the second kind) themselves show very little vulcanizing action. Therefore they cannot be independently used as the vulcanizing agent of bromobutyl rubber, but when used as a composite vulcanizing agent together with sulfur and/or sulfur-donor, the amino acids of the second kind characteristically exhibit far superior vulcanizing action than that of the conventional sulfur or sulfur-donor vulcanizing agent. That is, when bromobutyl rubber is vulcanized by the composite vulcanizing agent of the amino acid or acids of the second kind and sulfur, not only the reversion can be substantially prevented, but also the modulus of vulcanized rubber can be improved. Again, when the mixed system of the amino acid or acids of the second kind and a sulfur-donor is used for the vulcanization of bromobutyl rubber, the low modulus of vulcanized rubber can be drastically raised.

The effect of this third embodiment of the invention is entirely unexpected, in view of the fact that the similar effect could never be obtained when a mixed system of aspartic acid, which has a closely resembling chemical structure but is outside the amino acids of the second kind, and sulfur is used as the vulcanizing agent, as demonstrated in the later given Example 8.

Of the amino acids of the second kind, glutamic acid can be used as a salt, such as sodium glutamate.

The sulfur-donors useful in the third embodiment of this invention are the same as those mentioned in the descriptions of second embodiment. A composition provided by the third embodiment contains, per part by weight of the total of amino acid component of the second kind, from 0.01 to 30, preferably from 0.1 to 10 parts by weight of sulfur or a sulfur-donor; and per 100 parts by weight of bromobutyl rubber, from 0.06 to 50, preferably from 0.1 to 10 parts by weight of the mixed vulcanizing agent in accordance with the third embodiment.

The vulcanizable compositions of the first, second and third embodiments of this invention may contain, besides bromobutyl rubber and the vulcanizing agent, other conventionally used additives such as a reinforcing agent, pigment, softening agent, and a plasticizer if necessary. Furthermore, if desired, a vulcanization-accelerator, acid acceptor, vulcanization-activator and the like may be added.

The vulcanization of those compositions of the first, second and third embodiments can be performed by the ordinary procedures heretofore employed for vulcanizing bromobutyl rubber, under the conventionally practiced vulcanization conditions, for example, at the temperatures of 140°–180° C. and pressures of 180–210 Kg/cm$^2$.

The vulcanized bromobutyl rubber obtained by vulcanizing the compositions of the invention is useful in making for example, a tube, belt, hose, pipe, packing, tank-lining, rubber vibration insulator, electric wire, cable and rubber-coated fabrics. Furthermore, the rubber can be suitably used in the medicine and food industries such as for making stoppers of phials or food-containing bottles, cap linings, artificial internal organs and nipples of nursing bottles, these uses having been heretofore forbidden because of the inevitable elution of toxic acid acceptor.

Hereinafter the invention will be explained with reference to working Examples, in which the parts are by weight unless specified otherwise.

The testing methods employed in the Examples were as follows:

Vulcanization curve:
  The vulcanization curves were drawn using oscillating disc rheometer (TSS-model), excepting those in Example 7 and Control 1 in which a JSR-model curastmeter was used.
Tensile strength:
Elongation at break:
Modulus:
  The above three properties were determined in accordance with JISK-6301, using a Schopper type tensile strength tester with the pull rate of 500 mm/min.
Hardness:
  The hardness property was determined in accordance with JISK-6301, using a JIS-A type hardness tester.

The amino acids of the first kind were used in Examples 1 through 7, in which three typical and basic recipes of rubber compositions as shown in Table 1 below were used. The vulcanization effect of the vulcanizing agent comprising the amino acids of first kind were measured as to said three basic compositions.

In Examples 8–9, the effect of the vulcanizing agents containing the amino acids of second kind were examined.

Table 1

| Compounding Recipe No. | Recipe 1 | Recipe 2 | Recipe 3 |
|---|---|---|---|
|  | (parts) | (parts) | (parts) |
| Bromobutyl rubber[1] | 100 | 100 | 100 |
| SRF carbon black[2] | 30 | — | — |
| Nulok 321SP[3] | — | 50 | — |
| Nipseal VN3[4] | — | 10 | — |
| Chlorinated polyethylene[5] | — | — | 30 |
| Stearic acid[6] | 0.5 | 0.5 | 0.5 |

Table 1-continued

| Recipe No. Compounding | Recipe 1 | Recipe 2 | Recipe 3 |
|---|---|---|---|
| Total weight | 130.5 | 160.5 | 130.5 | vulcanized for the predetermined time with an electrothermal press of 165° C.

The physical properties of thus obtained vulcanized rubbers were as shown in Table 2.

Table 2

| | | Run No. | 1 | 2 | 3 | 4 | 5 | 6 | 7 |
|---|---|---|---|---|---|---|---|---|---|
| | | (parts) | | | | | | | |
| Compounding | Recipe 1 | | 130.5 | 130.5 | 130.5 | 130.5 | 130.5 | 130.5 | 130.5 |
| | Arginine | | 0.15 | 0.25 | 0.5 | 1 | 1.5 | 2 | 2.5 |
| | 50% Lysine aqueous solution | | 0.15 | 0.25 | 0.5 | 1 | 1.5 | 2 | 2.5 |
| Vulcanizing conditions | Temperature (° C.) | | 165 | 165 | 165 | 165 | 165 | 165 | 165 |
| | Time (min.) | | 30 | 30 | 30 | 15 | 15 | 15 | 10 |
| Rubber properties | Modulus at 300% elongation (Kg/cm$^2$) | | 7 | 12 | 14 | 20 | 23 | 31 | 27 |
| | Tensile strength (Kg/cm$^2$) | | 58 | 69 | 82 | 108 | 108 | 108 | 94 |
| | Elongation at break (%) | | 930 | 880 | 760 | 770 | 730 | 690 | 660 |
| | Hardness | | 36 | 36 | 36 | 38 | 38 | 39 | 38 |

Notes:
[1]Polysar Bromobutyl X-2 (resistered tradename) of Polysar Ltd.
[2]Semi-reinforcing furnace carbon black added as a reinforcing agent
[3]A product of Huber Co., U.S.A., kaoline clay surface-treated with aminosilan which was added as a reinforcing agent
[4]A product of Nippon Silica K.K., hydrous silica reinforcing agent which was added as a reinforcing agent
[5]Chlorinated polyethylene of the molecular weight no less than 100,000, with the chlorine content of approximately 40%, which was added to reduce the surface stickiness after vulcanization of the composition
[6]An additive added to improve the mill mixing processability of the composition

EXAMPLE 1

In this Example a mixture of arginine and lysine was used as the vulcanizing agent which was compounded to the blend in accordance with the basic recipe 1, at the weight ratios specified in Table 2 as in Run Nos. 1 through 7, and the compositions were vulcanized. The compounding and vulcanization were performed as follows.

The bromobutyl rubber was wound onto 8-inch open rolls of which surface temperature was maintained at 50° ± 5° C. with the interspace of the rolls adjusted to 1.4 mm. When the rubber surface became even, carbon black was added at fixed dosage at times to maintain the surface evenness, with the interspace of the rolls occasionally adjusted so as to maintain the bank constant. Upon adding half of the prescribed amount of carbon black, the composition was subjected to one ¾ cut each way, and thereafter the other half of carbon black was added. Then stearic acid and the predetermined amount of the mixture of 50% aqueous solution of lysine and arginine as indicated in Table 2 were added in the order stated. Thereafter three ¾ cuts each way were effected, and the batch was cut from the roll. The interspace of the rolls was narrowed to 0.7 mm, and the rolled stock was passed endwise therethrough six times. The batch was released, and aged for a day and night. Then using the open rolls used previously which were heated to 70° ± 5° C. and spaced by 0.2 mm, the rolled stock was passed through the rolls six times. Then the interspace of the rolls was broadened to 1.4 mm, and the batch was wound onto the roll and subjected to three ¾ cuts each way. The rubber compounds were sheeted out, and Separately, a 1:1 mixture (by weight) of arginine and 50% aqueous solution of lysine was compounded with the basic recipe 1 similarly to the above, the compounding ratio of the vulcanizing agent being adjusted to 10 PHR, 5PHR, 2PHR and 0.1 PHR for each run (PHR denoting the number of parts of the vulcanizing agent per 100 parts of bromobutyl rubber). Vulcanization curves of those compositions were drawn using an oscillating disc rheometer (TSS-model) with its temperature controlled to 170° C. The results were as shown in FIG. 1.

From the results shown in Table 2 and FIG. 1, it is apparent that bromobutyl rubber can be vulcanized by the vulcanizing agents used in this Example, with no reversion occurring. Although no acid acceptor was used in all the runs of this Example, no mold staining was observed.

EXAMPLE 2

In Run Nos. 1 through 5 of this Example, the composition of recipe 1 compounded with TE-58A (registered tradename) (an alkali metal salt of a higher fatty acid commercialized by Technical Processing Co., U.S.A.), which was used as an improver of mill mixing processability was vulcanized by the action of an amino acid alone as indicated in Table 3. The compounding and vulcanization were performed similarly to Example 1, excepting that the mixture of arginine and 50% aqueous solution of lysine added after stearic acid was replaced by each prescribed amount of a mixture of TE-58A and the amino acid specified in Table 3, and that the vulcanization temperature was raised to 170° C.

Also the use of TE-58A was omitted in Run No. 6, but 6 parts of an arginine paste containing 40% of water was added as the vulcanizing agent, all other conditions being identical with the Run Nos. 1 through 5.

The results of the experiments were as shown in Table 3. The vulcanization curves drawn with those compositions similarly to Example 1 were like those of the Example 1 compositions. In all the runs of this Example, neither reversion nor mold staining was observed.

Table 3

| | | Run No. | 1 | 2 | 3 | 4 | 5 | 6 |
|---|---|---|---|---|---|---|---|---|
| | | (parts) | | | | | | |
| | Recipe 1 | | 130.5 | 130.5 | 130.5 | 130.5 | 130.5 | 130.5 |
| | TE-58A | | 3 | 3 | 3 | 3 | 2 | — |
| | 50% Lysine aqueous solution | | 3 | — | — | — | — | — |
| | Arginine | | — | 3 | — | — | — | — |
| Compounding | 50% Ornithine | | — | — | 3 | — | — | — |

Table 3-continued

| Run No. | | 1 | 2 | 3 | 4 | 5 | 6 |
|---|---|---|---|---|---|---|---|
| | aqueous solution | | | | | | |
| | Cystine | — | — | — | 3 | — | — |
| | Glutamine | — | — | — | — | 3 | — |
| | Arginine paste | — | — | — | — | — | 6 |
| Vulcanizing conditions | Temperature (° C) | 170 | 170 | 170 | 170 | 170 | 170 |
| | Time (min.) | 15 | 15 | 20 | 30 | 30 | 15 |
| Rubber properties | Modulus at 300% elongation (Kg/cm$^2$) | 11 | 12 | 38 | 12 | 10 | 31 |
| | Tensile strength (Kg/cm$^2$) | 108 | 43 | 118 | 53 | 51 | 86 |
| | Elongation at break (%) | 720 | 670 | 670 | 750 | 720 | 510 |
| | Hardness | 32 | 30 | 38 | 34 | 32 | 34 |

EXAMPLE 3

In this Example, the compositions according to the recipe 2 were vulcanized by the similar vulcanizing agents used in Example 1. The compounding and vulcanization were performed similarly to Example 1, excepting that the carbon black employed in Example 1 was replaced by a homogeneous mixture of Nulok 321SP and Nipseal VN3, which was added to the roll to be compounded with bromobutyl rubber. The results of the experiments were as shown in Table 4.

Separately, a vulcanizing agent composed of a 1:1 mixture (by weight ratio) of arginine and 50% aqueous solution of lysine was compounded with the compositions of recipe 2 in the similar manner, at a compounding ratio of each of 10 PHR, 5 PHR and 1 PHR, and the vulcanization curves of the compositions were drawn similarly to Example 1. The results were as shown in FIG. 2. In none of the runs of this Example was mold staining observed.

The recipe 2 used in this Example is that for light colored rubber products containing no carbon black as a reinforcing agent. The vulcanized rubber obtained in this Example showed substantially no color change, and gave the intended light colored product.

Table 4

| | Run No. | 1 | 2 | 3 | 4 |
|---|---|---|---|---|---|
| | (parts) | | | | |
| Compounding | Recipe 2 | 160.5 | 160.5 | 160.5 | 160.5 |
| | Arginine | 1 | 1.5 | 2 | 2.5 |
| | 50% Lysine aqueous solution | 1 | 1.5 | 2 | 2.5 |
| vulcanizing conditions | Temperature (° C.) | 165 | 165 | 165 | 165 |
| | Time (min.) | 50 | 30 | 30 | 15 |
| Rubber properties | Modulus at 300% elongation (kg/cm$^2$) | 24 | 31 | 36 | 34 |
| | Tensile strength (Kg/cm$^2$) | 62 | 80 | 100 | 85 |
| | Elongation at break (%) | 730 | 780 | 780 | 720 |
| | Hardness | 44 | 46 | 46 | 45 |

EXAMPLE 4

In this Example the compositions according to the recipe 3 were vulcanized by the vulcanizing agents identified in Table 5, in Run Nos. 1 through 3. The compounding and vulcanization were effected as follows. Bromobutyl rubber was wound onto the open mixing roll of 50° ± 5° C. at the surfaces, with the interspace of the rolls adjusted to 1.2 mm. Sheet-formed chlorinated polyethylene was added thereonto while adjusting the interspace of the rolls so as to make the bank constant. After the addition the batch was subjected to three ¾ cuts each way. Then the batch was cut from the roll and after the space between the rolls was reduced to 0.7 mm, the rolled stock was passed endwise through the roll six times. The interspace of the rolls was adjusted so as to prevent the stock on the roll from overflowing but allowing the same to rotate, and the stock was wound onto the roll. Stearic acid, and then the mixture of three amino acids identified in Table 5 under Run Nos. 1 through 3 as the vulcanizing agent, were added by the order stated. After the addition the batch was subjected to three ¾ cuts each way, cut from the roll, and the rolled stock was passed endwise through the rolls spaced by 0.7 mm six times. The batch was released from the roll and aged for a day and night. The subsequent processings were identical with those of Example 1, and the resulting vulcanizable compositions were vulcanized with an electrothermal press of 170° C. The physical properties of thus obtained vulcanized rubbers were as shown in Table 5. Neither in this Example the reversion or mold staining was at all observed.

Table 5

| | Run No. | 1 | 2 | 3 |
|---|---|---|---|---|
| | (parts) | | | |
| Compounding | Recipe 3 | 130.5 | 130.5 | 130.5 |
| | Arginine | 2 | 3 | 3.6 |
| | 50% Ornithine aqueous solution | 2 | — | — |
| | 50% Lysine aqueous solution | — | 3 | 2.4 |
| Vulcanizing conditions | Temperature (° C.) | 170 | 170 | 170 |
| | Time (min.) | 15 | 15 | 15 |
| Rubber properties | Modulus at 300% elongation (Kg/cm$^2$) | 10 | 11 | 11 |
| | Tensile strength (Kg/cm$^2$) | 35 | 42 | 46 |
| | Elongation at break (%) | 560 | 660 | 620 |
| | Hardness | 30 | 30 | 30 |

EXAMPLE 5

In this Example the composite vulcanizing agents composed of sulfur and the amino acid of first kind were used to vulcanize the compositions according to basic recipe 2. The experiments were run under exactly the same conditions to those of Example 1, except that the vulcanizing agents specified in Table 6 were used.

The Run No. 1 is the Control wherein sulfur alone was used as the vulcanizing agent. The physical properties of the vulcanized rubbers were as shown in Table 6, and the vulcanization curves of the compounded rubbers used in the experiments, as measured similarly to Example 1, were as given in FIG. 3.

As demonstrated clearly in FIG. 3, when sulfur alone was used as the vulcanizing agent, the phenomenon of reversion (confirmed by the torque gradually decreased after reaching the maximum value) was conspicuous. In contrast thereto, absolutely no reversion was observed in the Runs using the composite vulcanizing agents of the invention.

Furthermore, in the Control the vulcanized rubber exhibited heavy color change to dark brown, and could not be used as light colored rubber. Whereas, the vulcanized rubbers obtained in Run Nos. 2 and 3 showed almost no color change, and could be sastisfactorily used as light colored rubber.

Because the Run No. 1 (Control) used no acid acceptor, conspicuous mold staining took place, but the other Runs using the composite vulcanizing agent of the amino acid and sulfur but no acid acceptor caused no mold staining. This fact signifies that the amino acids of the first kind specified in this invention possess not only the vulcanizing action but also function as the acid acceptor when used concurrently with sulfur.

Table 6

| | Run No. | 1 (Control) | 2 | 3 |
|---|---|---|---|---|
| | (parts) | | | |
| Compounding | Recipe 2 | 160.5 | 160.5 | 160.5 |
| | Sulfur | 1 | 1 | 1 |
| | Arginine | — | 1.5 | — |
| | 50% Lysine aqueous solution | — | 1.5 | — |
| | Arginine paste (water content 40%) | — | — | 6 |
| Vulcanizing conditions | Temperature (° C.) | 170 | 170 | 170 |
| | Time (min.) | 7 | 10 | 10 |
| Rubber properties | Modulus at 300% elongation (Kg/cm$^2$) | 49 | 61 | 49 |
| | Tensile strength (Kg/cm$^2$) | 135 | 147 | 135 |
| | Elongation at break (%) | 590 | 620 | 580 |
| | Hardness | 51 | 46 | 46 |

EXAMPLE 6

Similarly to Example 2, the composite vulcanizing agent composed of the mixture of sulfur and the amino acid of first kind was used for vulcanizing the raw batch comprising the composition of recipe 1 and TE-58A added as an improver of mill mixing processability. The experiments were run in the manner similar to Example 2.

The Run No. 1 is the Control in which sulfur alone was used as the vulcanizing agent.

The physical properties of the resulting vulcanized rubbers were as shown in Table 7, and the vulcanization curves, as shown in FIG. 4.

As is apparent also from FIG. 4, conspicuous reversion took place in Run No. 1, but no reversion was observed with Run Nos. 2 and 3.

Again heavy mold staining took place in Run No. 1 similarly to Example 5, which was nil in Run Nos. 2 and 3.

Table 7

| | Run Nos. | 1 (Control) | 2 | 3 | 4 |
|---|---|---|---|---|---|
| | (parts) | | | | |
| Compounding | Recipe 1 | 130.5 | 130.5 | 130.5 | 130.5 |
| | TE-58A | — | — | 3 | 3 |
| | Sulfur | 1 | 1 | 1 | 1 |
| | Arginine paste (water content 40%) | — | 6 | — | — |
| | 50% Lysine aqueous solution | — | — | 3 | — |
| | 50% Ornithine aqueous solution | — | — | — | 3 |
| Vulcanizing conditions | Temperature (° C.) | 170 | 170 | 170 | 170 |
| | Time (min.) | 10 | 10 | 10 | 10 |
| Rubber properties | Modulus at 300% elongation (Kg/cm$^2$) | 45 | 30 | 47 | 42 |
| | Tensile strength (Kg/cm$^2$) | 138 | 87 | 132 | 120 |
| | Elongation at break (%) | 620 | 530 | 610 | 620 |
| | Hardness | 41 | 34 | 36 | 36 |

EXAMPLE 7

The composite vulcanizing agent composed of the mixture of peroxide and the amino acid of the first kind was used with the compositions according to the recipe 1 in this Example. The compounding was as shown as to Run No. 2 of Table 8. The Run No. 1 of the same table is a Control in which the peroxide alone was used as the vulcanizing agent.

The raw batch was formed as follows. The procedures up to the addition of stearic acid were the same to those as described in Example 1. In Run No. 1, after the addition of stearic acid, dicumyl peroxide was added, followed by the procedures similar to those of Example 1, i.e., from the ¾ cutting to sheeting. The vulcanization was effected with a 170° C. electrothermal press for 20 minutes. In Run No. 2, dicumyl peroxide was added similarly to Run No. 1, and then a mixture of 50% aqueous solution of lysine and arginine was added, followed by the subsequent procedures similarly to Run No. 1. The vulcanization was effected with a 170° C. electrothermal press for 15 minutes. The vulcanization curves of those compositions were drawn at 170° C., using a JSR-model curastmeter.

The physical properties of the obtained vulcanized rubber were as shown in Table 8, and the vulcanization curves, as shown in FIG. 5.

Table 8

| | Run No. | 1 (Control) | 2 |
|---|---|---|---|
| | (parts) | | |
| Compounding | Recipe 1 | 130.5 | 130.5 |
| | Dicumyl peroxide[1] | 0.6 | 0.6 |
| | 50% Lysine aqueous solution | — | 1.2 |
| | Arginine | — | 1.8 |
| Vulcanizing conditions | Temperature (° C.) | 170 | 170 |
| | Time (min.) | 20 | 15 |
| Rubber properties | Modulus at 300% elongation (kg/cm$^2$) | 11 | 34 |
| | Tensile strength (Kg/cm$^2$) | 75 | 83 |
| | Elongation at break (%) | 750 | 520 |
| | Hardness | 30 | 30 |

Note:
[1] The effective ingredient of the dicumyl peroxide was 40%.

Heavy mold staining tool place in Run No. 1 because the peroxide was used as the vulcanizing agent without the acid acceptor, which was nil in Run No. 2. This signifies that the amino acid of the first kind specified in this invention acts not only as the vulcanizing agent, but also as the acid acceptor when used concurrently with the peroxide.

Furthermore, the vulcanized rubber of Run No. 2 had a markedly greater modulus than that of the product of Run No. 1 as indicated in Table 8, and the vulcanization curve of Run No. 2 showed drastically sharper rise than that of Run No. 1 as demonstrated in FIG. 5. Those facts signify that the composite vulcanizing agent of Run No. 2 has substantially improved vulcanizing ability compared with the vulcanizing agent composed of the peroxide alone, and consequently achieves far higher cross-linking density.

Control 1

In this Control 1 it is demonstrated that the amino acid mixtures specified in this invention have no vulcanizing effect on chlorobutyl rubber.

A raw batch was formed from the following ingredients:

|  | (parts) |
| --- | --- |
| Esso Butyl HT10-66* | 100 |
| SRF carbon black | 30 |
| Stearic acid | 0.5 |
| Arginine | 2.5 |
| 50% Aqueous solution of Lysine | 2.5 |

(Note):
*chlorinated butyl rubber, a product of Exxon Chemical Company, U.S.A.

The compounding was effected in the identical manner with Example 1, except that the bromobutyl rubber was replaced by the chlorobutyl rubber, and the batch was heat-treated with an electrothermal press of 165° C. for 30 minutes. However the resulting rubber was extremely weak, and readily broken when lightly pulled by the test man. That is, it is apparent that the above heat treatment failed to produce a rubber elastomer, and therefore no vulcanization took place. This was also confirmed by measuring the flow curve of the above composition at 170° C. using the aforesaid JSR-model curastmeter. The flow curve was as shown in FIG. 6, which clearly shows that the chlorobutyl rubber was not at all vulcanized by the mixture of arginine and lysine.

EXAMPLE 8

Bromobutyl rubber was vulcanized by the vulcanizing agent of this invention composed of the amino acid of second kind as identified in Table 9 combined with sulfur (Run Nos. 1-14). The results were as also shown in Table 9.

The results of the similar vulcanization using sulfur alone as the vulcanizing agent (Control Run No. 1) and that using the combination of aspartic acid, an amino acid outside the specified groups of amino acids of this invention, and sulfur as the vulcanizing agent (Control Run No. 2) are also given in the same table.

The recipes of the rubber compositions used in the experiments were as below:

| Compounding | Control Run No. 1 | Run Nos. 1 – 14 and Control Run No. 2 |
| --- | --- | --- |
| Bromobutyl rubber[1] | 100 | 100 |
| SRF-L carbon black[2] | 40 | 40 |
| Sulfur | 1 | 1 |
| TE-58A[3] | 2.5 | 2.5 |
| Amino acid | — | 2.5 |

Notes:
[1] The same bromobutyl rubber as employed in Example 1
[2] A semi-reinforcing furnaces low structure carbon black, added as a reinforcing agent
[3] The same improver of mill mixing processability as used in Example 2

The compounding and vulcanization were performed as follows.

The bromobutyl rubber was wound onto 8-inch open roll spaced by 1.4 mm and maintained at 50° ± 5° C. at the surface. When the rubber surface became even, the carbon black was added by a fixed quantity at times evenly to the roll surface, while occasionally adjusting the interspace of the rolls to maintain the bank constant. When half of the prescribed amount of carbon black was added, the composition was subjected to a ¾ cut each way, and the other half of the carbon black was added in the similar manner. Then the sulfur and the mixture of TE-58A and amino acid were added by the order stated. (In Control 2, however, TE-58A alone was added.) Thereafter the batch was given three ¾ cuts each way, cut from the roll and wound up. The interspace of the rolls was reduced to 0.7 mm, and the rolled stock was passed endwise through the rolls six times. The compounded rubber was released, aged for a day and night, and passed through the open roll used for the compounding six times in thin sheet form, the roll temperature being controlled to 70° ± 5° C. and the roll interspace, to 0.2 mm.

Then the roll interspace was broadened to 1.4 mm, and the sheet was wound onto the roll, followed by three ¾ cuts each way. The compounded rubber was then sheeted out, and vulcanized with a 170° C. electrothermal press for 15 minutes.

The physical properties of the so obtained vulcanized rubbers were as shown in Table 9.

From the results in Table 9, it can be understood that when the mixtures of the specified amino acid or acids of the second kind and sulfur were used as the vulcanizing agent, the modulus of the vulcanized rubber is improved over than that of the case using sulfur alone. Whereas, when aspartic acid was used in combination with sulfur, the modulus of vulcanized rubber decreased instead, compared with the case using sulfur alone.

Also the occurrence of reversion was examined by drawing the vulcanization curves of the unvulcanized rubber compositions obtained by the foregoing compounding procedures, using an oscillating disc rheometer with the controlled temperature of 170° C. It was found that the reversion was nil in Run Nos. 1 through 14, or if occurred, to a very minor degree. Whereas, both in Control Run Nos. 1 and 2, the reversion was conspicuous. As the most typical of the vulcanization curves obtained as to Run Nos. 1 through 14, that of Run NO. 1 is shown in FIG. 7, together with those of Control Run Nos. 1 and 2.

Table 9

| Run No. | Amino Acid Used | Rubber Property | | | |
|---|---|---|---|---|---|
| | | Modulus at 300% elongation (Kg/cm²) | Tensile strength (Kg/cm²) | Elongation at break (%) | Hardness |
| Control 1 | — | 45 | 136 | 640 | 40 |
| 1 | histidine | 61 | 121 | 480 | 43 |
| 2 | hydroxyproline | 55 | 118 | 500 | 44 |
| 3 | tryptophan | 52 | 135 | 570 | 45 |
| 4 | threonine | 48 | 120 | 540 | 43 |
| 5 | leucine | 59 | 139 | 540 | 43 |
| 6 | iso-leucine | 66 | 129 | 480 | 43 |
| 7 | serine | 56 | 118 | 470 | 42 |
| 8 | valine | 66 | 122 | 470 | 43 |
| 9 | methionine | 63 | 129 | 490 | 43 |
| 10 | tyrosine | 48 | 125 | 550 | 42 |
| 11 | Glycine | 49 | 127 | 570 | 42 |
| 12 | Alanine | 50 | 101 | 460 | 41 |
| 13 | Glutamic acid | 48 | 112 | 500 | 41 |
| 14 | Sodium glutamate | 46 | 124 | 560 | 40 |
| Control 2 | Aspartic acid | 38 | 122 | 640 | 39 |

EXAMPLE 9

In this Example the composite vulcanizing agent composed of the amino acid of second kind and two sulfur donors were used to demonstrate the effect of this invention.

The recipes of the unvulcanized rubber compositions used in the experiments were as follows:

| Compounding | Control Run No. 1 | Run No. 1 | Run No. 2 | Control Run No. 2 | Run No. 3 |
|---|---|---|---|---|---|
| Bromobutyl rubber[1] | 100 | 100 | 100 | 100 | 100 |
| SRF-L carbon black[1] | 40 | 40 | 40 | 40 | 40 |
| Vulnoc R[3] | 1 | 1 | 1 | — | — |
| NOCCELER TRA[4] | — | — | — | 1 | 1 |
| TE-58A | 2.5 | 2.5 | 2.5 | 2.5 | 2.5 |
| Tryptophan | — | 2.5 | — | — | — |
| Proline | — | — | 2.5 | — | — |
| Histidine | — | — | — | — | 2.5 |

Notes:
(1), (2), and (3) are respectively the same to those used in Example 8.
(3) and (4) are respectively morpholine disulfide and dipentamethylenethiuram tetrasulfide manufactured by Ohuchi Shinko Kagaku Kogyo K. K., both being the sulfur-donor vulcanizing agents which release active sulfur at the vulcanizing temperature.

The compounding and vulcanization in each run were performed under the identical conditions with those of Example 8, except that the sulfur-donors were used instead of the sulfur and the vulcanization was effected at 170° C. for 20 minutes. The physical properties of the vulcanized rubbers obtained were as shown in Table 10 below:

Table 10

| | Control Run No. 1 | Run No. 1 | Run No. 2 | Control Run No. 2 | Run No. 3 |
|---|---|---|---|---|---|
| Modulus at 300% elongation (Kg/cm²) | 31 | 37 | 36 | 31 | 39 |
| Tensile strength (Kg/cm²) | 134 | 114 | 143 | 140 | 131 |
| Elongation at break (%) | 680 | 570 | 770 | 760 | 680 |
| Hardness | 38 | 41 | 39 | 38 | 40 |

The vulcanization curves of the rubber compositions used in Run No. 3 and Control Run No. 2 which were drawn by the same method as described in Example 1 are shown in FIG. 8.

I claim:

1. A vulcanizable composition comprising bromobutyl rubber, at least one amino acid selected from the group consisting of tyrosine, theronine, tryptophan, proline, hydroxyproline, serine, histidine, glycine, glutamic acid, leucine, alanine, phenylalanine, valine, iso-leucine and methionine, and at least one vulcanizing agent selected from the group consisting of sulfur and a sulfur-donor, with the proviso that said vulcanizable composition does not contain any zinc oxide or lead oxide.

2. A vulcanizable composition comprising bromobutyl rubber, at least one amino acid selected from the group consisting of arginine, lysine, hydroxylysine, ornithine, cystine, asparagine, glutamine and citrulline, and at least one vulcanizing agent selected from the group consisting of sulfur and a sulfur-donor, with the proviso that said vulcanizable composition does not contain any zinc oxide or lead oxide.

3. The composition of claim 2 which contains, per part by weight of the amino acid component, no more than 30 parts by weight of sulfur and no more than 30 parts by weight of sulfur-donor, the total amount of the amino acid and the vulcanizing agent being 0.06–50 parts by weight per 100 parts by weight of the bromobutyl rubber.

4. The composition of claim 2 in which the sulfur-donor is selected from the group consisting of tetraethylthiuram disulfide, tetraethylthiuram monosulfide, tetrabutylthiuram disulfide, N,N'-dimethyl-N,N-diphenylthiuram disulfide, dipentamethylenethiuram monosulfide, dipentamethylenethiuram disulfide, dipentamethylenethiuram tetrasulfide, dipentamethylenethiuram hexasulfide, dicyclopentamethylenethiuram disulfide, mixed alkyl thiuram disulfide, tetramethylthiuram monosulfide, tetramethylthiuram disulfide, sulfur monochloride, sulfur dichloride, morpholine disulfide, alkyl phenol disulfide, N,N'-dithiobis(hexahydro-2H-azepinone-2), 2-mercaptobenzothiazole, 2-mercaptothiazoline, dibenzothiazyl disulfide, N,N-diethylthiocarbamoyl-2-benzothiazolyl sulfide, and 2-(2,6-dimethyl-4-morpholinothio)benzothiazole.

5. The composition of claim 1 which contains, per part by weight of the amino acid component, no more than 30 parts by weight of sulfur or no more than 30 parts by weight of sulfur-donor, the total amount of the amino acid and vulcanizing agent being from 0.06 to 50 parts by weight per 100 parts by weight of the bromobutyl rubber.

6. The composition of claim 1 in which the sulfur-donor is selected from the group consisting of tetraethylthiuram disulfide, tetraethylthiuram monosulfide, tetrabutylthiuram disulfide, N,N'-dimethyl-N,N-diphenylthiuram disulfide, dipentamethylenethiuram monosulfide, dipentamethylenethiuram disulfide, dipentamethylenethiuram tetrasulfide, dipentamethylenethiuram hexasulfide, dicyclopentamethylenethiuram disulfide, mixed alkyl thiuram disulfide, tetramethylthiuram monosulfide, tetramethylthiuram disulfide, sulfur monochloride, sulfur dichloride, morpholine disulfide, alkyl phenol disulfide, N,N'-dithio-bis(hexahydro-2H-azepinone-2), 2-mercaptobenzothiazole 2-mercaptothiazoline, dibenzothiazyl disulfide, N,N-diethylthiocarbamoyl-2-benzothiazolyl sulfide, and 2-(2,6-dimethyl-4-morpholinothio)benzothiazole.

* * * * *